(12) United States Patent
Smith, III

(10) Patent No.: US 9,370,788 B2
(45) Date of Patent: Jun. 21, 2016

(54) CHEMICAL APPLICATION APPARATUS FOR SPRINKLER SYSTEMS

(71) Applicant: Robert E. Smith, III, Missouri City, TX (US)

(72) Inventor: Robert E. Smith, III, Missouri City, TX (US)

(73) Assignees: Gary L. Groves, Jr., Houston, TX (US); Robert E. Smith, III, Houston, TX (US)

( * ) Notice: Subject to any disclaimer, the term of this patent is extended or adjusted under 35 U.S.C. 154(b) by 0 days.

(21) Appl. No.: 14/265,547

(22) Filed: Apr. 30, 2014

(65) Prior Publication Data

US 2014/0231548 A1  Aug. 21, 2014

Related U.S. Application Data

(62) Division of application No. 11/424,773, filed on Jun. 16, 2006, now Pat. No. 8,746,593.

(51) Int. Cl.
*B05B 7/32* (2006.01)
*A01C 23/04* (2006.01)

(52) U.S. Cl.
CPC .............. *B05B 7/32* (2013.01); *A01C 23/042* (2013.01)

(58) Field of Classification Search
CPC ........ B05B 7/244; B05B 7/2443; B05B 7/24; B05B 7/26; B05B 7/28; B05B 7/32; A01C 23/042; A01C 23/00; A01C 23/04
USPC ................... 239/310, 315, 316, 318
See application file for complete search history.

(56) References Cited

U.S. PATENT DOCUMENTS

| | | | |
|---|---|---|---|
| 2,606,068 A | 8/1952 | Bonacor | |
| 2,785,012 A | 3/1957 | Frewin | |
| 3,455,054 A | 7/1969 | Tibbals, Jr. | |
| 4,272,019 A | 6/1981 | Halaby, Jr. | |
| 4,767,058 A * | 8/1988 | LaRosa et al. | 239/309 |
| 4,883,086 A | 11/1989 | Lejnar | |
| 4,907,618 A | 3/1990 | Ho | |
| 4,971,091 A | 11/1990 | Ho | |
| 5,178,181 A | 1/1993 | Craig | |
| 5,199,645 A | 4/1993 | Anderson et al. | |
| 5,303,729 A | 4/1994 | DeMarco | |
| 5,341,836 A | 8/1994 | Doherty | |
| 5,364,030 A | 11/1994 | Murdock et al. | |
| 5,366,159 A | 11/1994 | Childers | |

(Continued)

OTHER PUBLICATIONS

Examination Report under Section 18(3) received in corresponding GB application No. GB0711415.0 dated Oct. 11, 2007.

(Continued)

*Primary Examiner* — Christopher Kim
(74) *Attorney, Agent, or Firm* — Blank Rome, LLP

(57) ABSTRACT

A liquid chemical dispenser for an irrigation system comprises a removable supply container for the chemical which, in a first embodiment, comprises a valve for preventing spillage of the chemical during attachment of the container to the dispenser. This feature allows the container to be mounted in an inverted position on the dispenser without loss of its contents. In a second embodiment, the chemical container comprises a membrane which is pierced by a dip tube when the container is attached to the dispenser. A section of the dip tube produces an annular vent passage in the membrane around the dip tube to provide vacuum relief. The configuration of the containers substantially reduces the chance of inadvertent contact with the contents and the simple design permits the containers to be disposable.

4 Claims, 4 Drawing Sheets

(56) References Cited

U.S. PATENT DOCUMENTS

| | | |
|---|---|---|
| 5,529,244 A | 6/1996 | Horvath, Jr. et al. |
| 5,836,518 A | 11/1998 | Jester |
| 5,839,665 A | 11/1998 | DiVittorio |
| 6,173,732 B1 | 1/2001 | Davis et al. |
| 6,206,046 B1 | 3/2001 | Finley |
| 6,267,303 B1 | 7/2001 | Francis |
| 6,371,385 B1 | 4/2002 | Schiller et al. |
| 6,540,156 B2 | 4/2003 | Martin |
| 6,722,583 B2 | 4/2004 | Restaino, Jr. et al. |
| 6,796,514 B1 * | 9/2004 | Schwartz ............... 239/345 |
| 6,942,128 B1 | 9/2005 | Walter |
| 6,969,011 B2 | 11/2005 | Palmer |
| 6,997,350 B2 | 2/2006 | Johnson et al. |
| 7,011,254 B2 | 3/2006 | Thornton |
| 7,083,118 B1 | 8/2006 | Bowles et al. |
| 7,156,324 B2 | 1/2007 | Birrenkott et al. |

OTHER PUBLICATIONS

Search and Examination Report received in corresponding application No. GB0711415.0 dated Apr. 23, 2008.

* cited by examiner

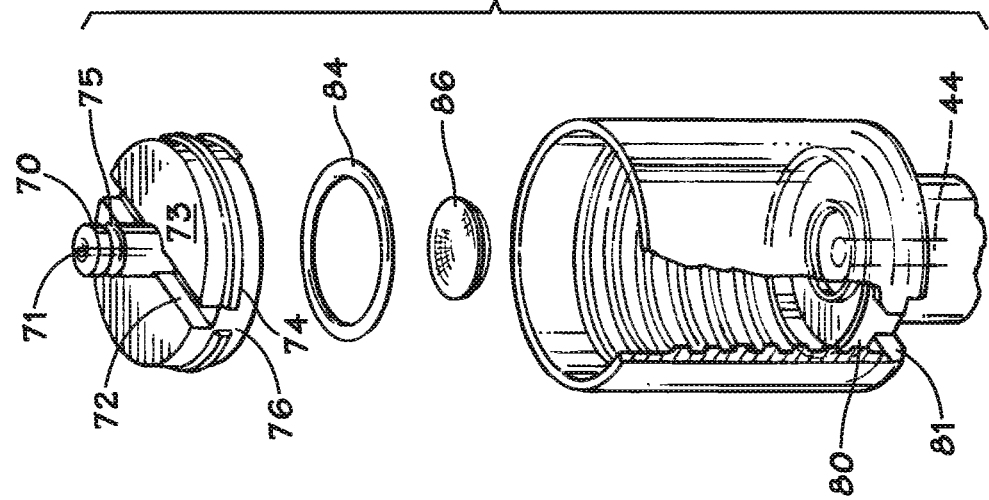
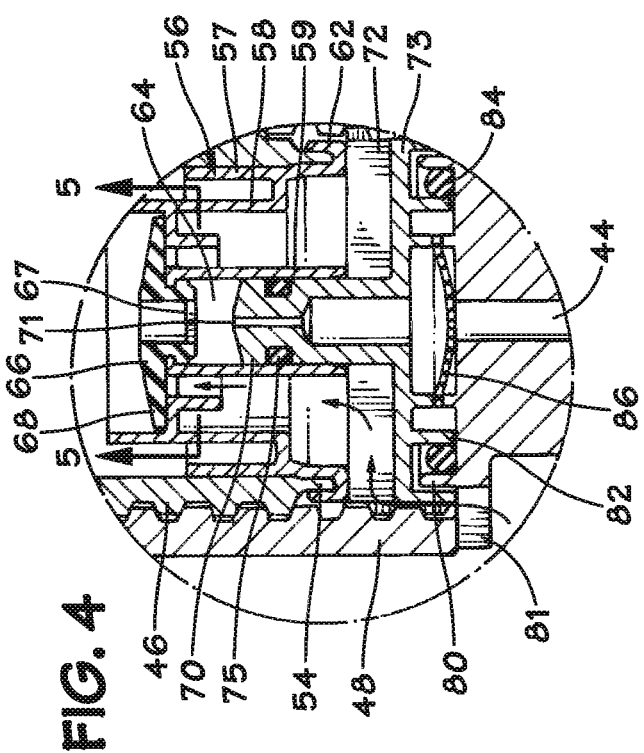
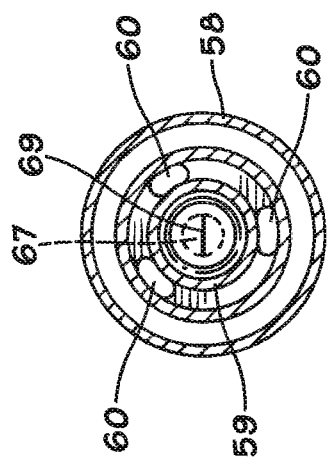

CHEMICAL APPLICATION APPARATUS FOR SPRINKLER SYSTEMS

CROSS-REFERENCE TO RELATED APPLICATIONS

This application is a division of U.S. patent application Ser. No. 11/424,773 filed Jun. 16, 2006, now issued as U.S. Pat. No. 8,746,593.

BACKGROUND OF THE INVENTION

1. Field of the Invention

This invention relates to irrigation systems. More particularly, it relates to devices for adding liquid fertilizers, insecticides, herbicides, fungicides and the like to the water distributed by an automatic sprinkler system.

2. Description of the Related Art

The availability of low-cost PVC pipe and solvent-welded PVC pipe fittings has resulted in the widespread installation and use of automatic sprinkler systems. Such systems typically comprise a source of fresh water under pressure (often a community water utility), a manifold for distributing the water into various zones each having a plurality of sprinkler heads, a series of electrically-actuated valves for controlling the flow of water in each of the zones, a timer for opening and closing the valves at pre-selected times or time intervals, and a backflow prevention device for keeping possibly contaminated water from re-entering the supply system.

An in-ground, automatic sprinkler system presents the opportunity to conveniently distribute water-soluble chemicals such as fertilizers, weed killers, fungicides, and insecticides to areas served by the system. A number of United States patents concern devices for adding water soluble chemicals to sprinkler and irrigation systems.

U.S. Pat. No. 7,011,254 to Thornton describes a lawn chemical application system that comprises a dispenser having a lower chamber, an upper chamber, an upstream opening, and a downstream opening. The dispenser may be formed by a tee connector and a cylinder secured to an upper opening of the tee connector. Powered valves are operably connected to the upstream and downstream openings of the dispenser. The powered valves may be wired to open and close simultaneously. A lower portion of the upper chamber may be disposed below an upper portion of the lower chamber and above a lower portion of the lower chamber, leaving the lower portion of the lower chamber unobstructed over substantially its entire length. The lower portion of the upper chamber may have a plurality of openings to provide for adequate mixing of water with the chemicals stored in the upper chamber. In operation, soluble matter or other chemicals are placed in the upper chamber of the dispenser, and the two valves are opened simultaneously. Water flows through the first powered valve and into the dispenser, where the water is mixed with soluble matter or other chemicals stored in the upper chamber of the tee. The solution or mixture then passes from the dispenser, through the second powered valve, to one or more sprinkler heads of the irrigation system. When the application is finished, the valves are closed simultaneously.

U.S. Pat. No. 6,997,350 to Johnson et al. describes an apparatus for adding liquid fertilizer to a water line of a sprinkler system. The apparatus includes a mechanical injector device powered by a paddle wheel turned by water flowing through the water line. The mechanical injector device includes a plunger that moves back and forth in the plunger chamber. Movement in one direction allows liquid fertilizer from a liquid fertilizer reservoir to flow into the plunger chamber and movement of the plunger in the opposite direction injects the liquid fertilizer from the plunger chamber into the water. The mechanical injector device is coupled to the paddle wheel which causes movement of the plunger in the plunger chamber in at least one direction. Spring bias can cause movement of the plunger in the other direction. The mechanical injector device can be disabled to stop fertilizer injection while still allowing rotation of the paddle wheel. The paddle wheel is coupled to the mechanical injector device through a plunger gear which rotates, and interacting camming surfaces which project from the plunger gear and from a ratchet.

U.S. Pat. No. 6,969,011 to Palmer describes a chemical additive dispensing device for use with a station of a sprinkler-based irrigation system that includes a fluid diversion housing and a container for storing a chemical additive. The fluid diversion housing includes an in-flow channel formed therein that is in fluid communication with an input port and the container. An out-flow channel is also formed within the fluid diversion housing and is in fluid communication with an output port and the container. In operation, the container fills with fluid from the in-flow channel such that the fluid mixes with the chemical additive. Once the container is filled with fluid, the mixture of fluid and chemical additive is diverted through the out-flow channel of the fluid diversion housing to the outlet port such that the fluid chemical additive mixture is distributed to the rest of the irrigation system and particularly through sprinklers onto a lawn and/or plants.

U.S. Pat. No. 6,942,128 to Walter describes an automatic dispenser for underground sprinkler-systems. The unit is placed before the zone valves of the sprinkler system. The unit is designed to disperse fertilizer into a tank chamber below a discharge tray. The fertilizer dissolves in the water and is distributed/dispersed to the appropriate sprinkler system zone. The discharge tray has multiple chambers based on the number of zones in the sprinkler system. The chambers in the discharge tray can hold various capacities based on the area covered by each zone within the sprinkler system. The discharge tray turns to dispense the fertilizer as the sprinkler system changes from zone to zone. The discharge tray is automatically moved. The chambers are manually refilled based on the frequency of yard fertilization. The unit has an access from the top to the discharge tray for filling chambers with fertilizer material.

U.S. Pat. No. 6,722,583 to Restaino et al. describes a lawn sprinkler accessory with a hollow body defining a chamber for holding lawn treatment material, such as fertilizer, herbicide or insecticide. The accessory body has a hollow water inlet arm on one side and a hollow water outlet arm on the opposite side of the chamber. An access opening with a removable closure in one end of the accessory body enables the insertion of lawn treatment material into the chamber and its removal from the chamber.

U.S. Pat. No. 6,540,156 to Martin describes a fertilizer and irrigation apparatus that includes an inflow pipe, a shunt pipe connected to the inflow pipe, and a chemical additive assembly connected in parallel to the shunt pipe. An outflow pipe is also connected to the shunt pipe. A portion of the inflow pipe, the shunt pipe, the chemical additive assembly, and the outflow pipe are all above ground. The chemical additive assembly includes a quantity of a chemical additive. A manifold is connected to the outflow pipe. A plurality of in-ground distribution conduits are connected to the manifold, wherein each of the distribution conduits includes at least one above-ground sprinkler head. In addition, an auxiliary inflow assembly can be connected to the inflow pipe so that chemical additives can be supplied to the fertilizer and irrigation apparatus from an outside source.

U.S. Pat. No. 6,267,303 to Francis describes a sprinkler system fertilizer injector that comprises a device for injecting liquid chemical solutions into the flow of a lawn sprinkler system. The device is said to allow the user to easily attach and remove chemical jars without the risk of losing the prime on the pump.

U.S. Pat. No. 6,206,046 to Finley describes a lawn and garden chemical dispensing system that employs an I.V.-style collapsible bag as a water flow controlled dispenser of liquid or water-soluble beneficial chemicals for sprinkling systems. The system consists of a stand, a chemical vessel, a vessel sleeve, a vessel cap with dual port (internal/external) bulkhead union, an optional filter attachment, a chemical feed tube, and a control valve tap connected to a water flow supply.

U.S. Pat. No. 6,173,732 to Davis et al. describes a chemical feeding system for adding either liquid or 100% water soluble solid chemicals including fertilizer, insecticide and a herbicide to a lawn sprinkler system either above or below ground level. The system has one or two vertically oriented mixing chambers containing a removable sponge filter. An effluent tube is attached to the bottom of the mixing chamber for recycling through an adjustable flow meter valve. A drain tube with a shutoff valve and a one-way check valve leads to the main sprinkler system.

U.S. Pat. No. 5,836,518 to Jester describes a fertilizer sprinkler system including a pipe system adapted for flow of liquid therethrough. The pipe system is comprised of an open inboard portion, a closed outboard portion and an intermediate portion. The inboard portion is coupled to a main water line. The intermediate portion is defined by a first vertical member, a horizontal member and a second vertical member. The intermediate portion further has a lower horizontal member having a first end in fluid communication with the first vertical member and a second end in fluid communication with the second vertical member. The lower horizontal member has an intermediate segment having an integral lid extending downwardly therefrom. The lid has an inlet port and an outlet port therethrough. A fertilizer container removably couples with the lid of the pipe system. A plurality of outlet valves are positioned within the outboard portion of the pipe system. The plurality of outlet valves are adapted for coupling with sprinklers.

U.S. Pat. No. 5,366,159 to Childers describes an automatic fertilizing apparatus which injects fertilizer directly into the water stream of a sprinkler system. Each time the sprinkler system is activated, a predetermined amount of fertilizer is dispensed into the water stream. The apparatus can be controlled to dispense fertilizer only thru sprinkler lines determined by the user.

U.S. Pat. No. 5,364,030 to Murdock et al. describes a solution injector for underground sprinkler systems comprising an intake pipe connected with a bypass pipe at a system inlet pipe "T", a tank, and an outflow pipe connected at one end to the tank and at the other to the bypass pipe. The intake pipe is connected to the tank through an intake valve and an intake hose, and the solution injector further comprises a bypass valve installed on the bypass pipe between the system inlet pipe "T" and the system outlet pipe "T".

U.S. Pat. No. 5,303,729 to DeMarco describes An automatic fertilizing device for introducing lawn care chemicals such as fertilizer, herbicides, insecticides, and fungicides into a sprinkler system, comprising a container having a control plate insert to divide the container into an upper and lower volume. The container and control plate are mounted to a flow head, such that the flow head controls the amount of chemicals drawn from the container and dispersed into the main water line.

U.S. Pat. No. 5,199,645 to Anderson et al. describes a conversion kit for converting an existing sprinkler system liquid supply line into a general purpose soluble chemical application device is used to apply insecticides or fertilizer. The easily installed kit mixes dry chemicals with an existing pressurized liquid to form and expel appropriate treatment solution. Spent dry chemicals can be easily replaced in a removable canister. Chemicals from conventional bulk packages or specially prepared packets may be used. A safety interlock shutoff valve is provided to prevent pressurization of the system while chemicals are being replaced. A vacuum breaking air vent valve is provided to allow drainage of liquid from the system. All components are enclosed within and supported by a single housing.

U.S. Pat. No. 5,178,181 to Craig describes an applicator for use with a sprinkler line system. The applicator comprises a fertilizer container with integrally formed internal inlet and outlet tubes. Water is fed through an inlet-outlet tube into the bottom of the fertilizer container, where it dissolves or dilutes some of the solid or liquid fertilizer and forms a leached, concentrated solution. This concentrate continuously rises through the fertilizer and into the outlet tube where it drains downwardly. The concentrate is then diluted with water coming through the inlet-outlet tube including a venturi, the size of which controls the flow rate of the concentrate. The diluted concentrate is then passed into the sprinkler system for application to vegetation. The bore arrangement of the applicator enables the device to be drained and then filled with fertilizer, followed by running water through the fertilizer at a selected time. This is said to render the operation more automatic.

BRIEF SUMMARY OF THE INVENTION

A dispenser for attachment to a sprinkler system is adapted to receive or connect to a disposable container filled with a water-soluble chemical or an aqueous solution. The container is designed such that the user is not exposed to the chemical or solution when attaching or removing the container from the dispenser.

BRIEF DESCRIPTION OF THE SEVERAL VIEWS OF THE DRAWING(S)

FIG. 4 is an enlarged cross-sectional view of the portion indicated in FIG. 3.

FIG. 5 is a cross-sectional view taken along line 5-5 in FIG. 4.

FIG. 6 is a partially cut-away, exploded view of the connector portion of the chemical dispenser illustrated in FIGS. 1 and 3.

DETAILED DESCRIPTION OF THE INVENTION

Figure 1:
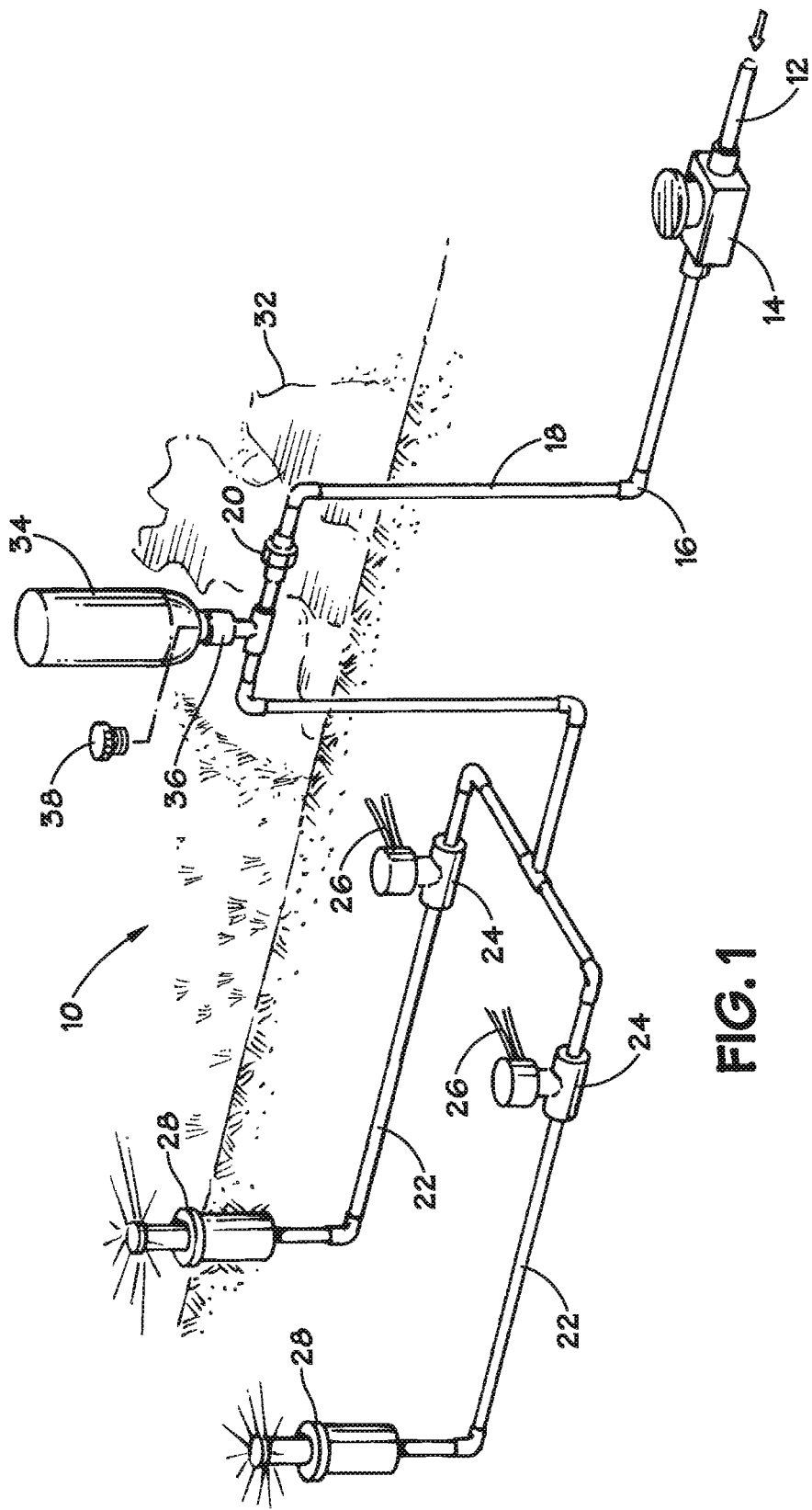
FIG. 1 depicts a lawn sprinkler system equipped with a chemical dispenser according to a first embodiment of the invention.

Referring to FIG. 1, a typical in-ground lawn sprinkler system 10 includes water line 12 for supplying fresh water from a pressurized source—e.g., a community water system, a well, a spring, surface water or the like. Backflow preventer or anti-siphon valve 14 may be included in line 12 to prevent the contamination of the water source in the event of a loss of supply pressure. The illustrated system is comprised of two zones, each comprising a branch line 22, at least one sprinkler head 28, and an electrically-actuated solenoid valve 24. Electrical conductors 26 connect valves 24 to a central control station (not shown) which may comprise a timer for opening and closing selected valves 24 at pre-selected times. In operation, a selected valve 24 may be opened, causing water to flow from supply line 12, through the branch line 22 downstream from the selected valve 24 and out onto lawn 30 by way of the sprinkler head(s) 28 connected to branch line 22. The simplified sprinkler system 10 of FIG. 1 comprises only two zones, each having a single sprinkler head. It will be understood by those skilled in the art that an actual sprinkler system may have any number of zones and the number of sprinkler heads per zone may be limited by the supply pressure and the size of the pipes and fittings comprising the system. The invention is not limited to use with lawn sprinkler systems, but may be used in conjunction with any irrigation system. Even residential systems may include separate zones for watering shrubs, foundations, planters, and the like. The present invention is applicable to all such systems.

FIG. 1 also illustrates one method for installing the system of the present invention in an existing, in-ground sprinkler system. A section of supply line 12, downstream of backflow preventer 14 may be removed and elbows 16 and risers 18 installed so that a portion of supply line 12 is accessible, preferably above grade. This portion of supply line 12 may include union 20 for ease of installation. Chemical dispenser 36 is plumbed in series with supply line 12. Chemical container 34 is shown mounted to dispenser 36. The system may include optional cap or plug 38 for ensuring the watertight integrity of dispenser 34 when a chemical container is not mounted thereon. Plug 38 may have the same thread configuration as the neck of container 34 such that it connects to dispenser 36 in the same way as a chemical container 34. Alternatively, cap 38 may be provided with separate connection means for sealing engagement with the body of dispenser 36. As shown in FIG. 1, dispenser 36 and the above-ground portion of supply line 12 may be concealed from view with shrubbery 32.

Figure 2:
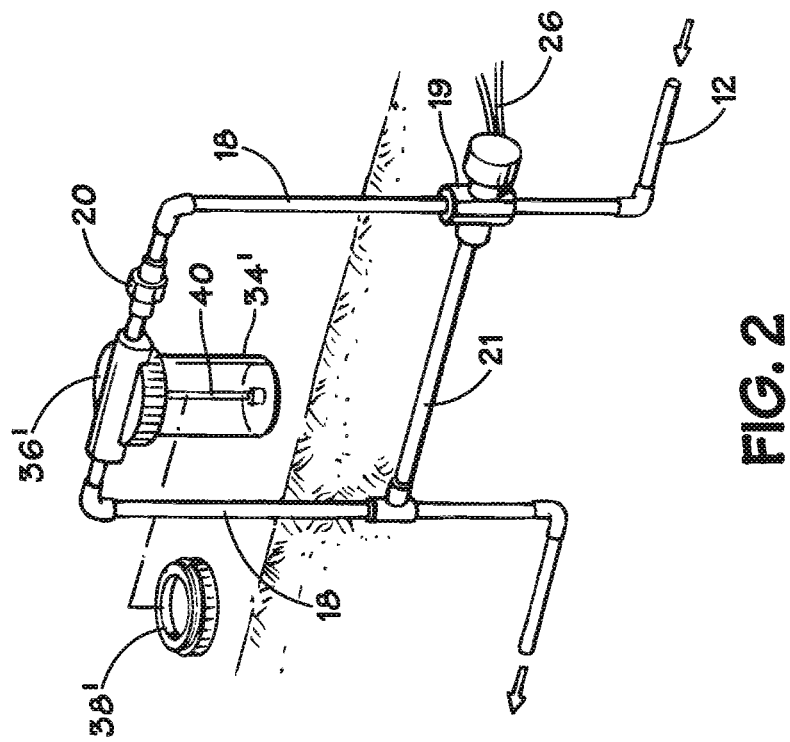
FIG. 2 illustrates a chemical dispenser according to a second embodiment of the invention installed in the supply line of an in-ground sprinkler system.

FIG. 2 illustrates an alternative second embodiment of the invention wherein chemical container 34' is mounted below disperser 36'. In this embodiment, dispenser 36' includes dip tube 40 for withdrawing a liquid chemical or chemical solution from container 34' Dip tube 40 may be in threaded engagement with dispenser 36' for ease of removal. Plug 38' may be used to seal dispenser 36' when container 34' and dip tube 40 are not present.

Also shown in FIG. 2 is optional bypass line 21 and bypass valve 19 connected between risers 18. Bypass valve 19 may be a 3-way valve which may direct the flow of water from supply line 12 to either dispenser 36 or through bypass line 21 to the distribution system. In some embodiments, bypass valve 19 may be an electrically-actuated valve and electrical control lines 26 may receive control signals from a remote timer and/or control station (not shown).

Figure 3:
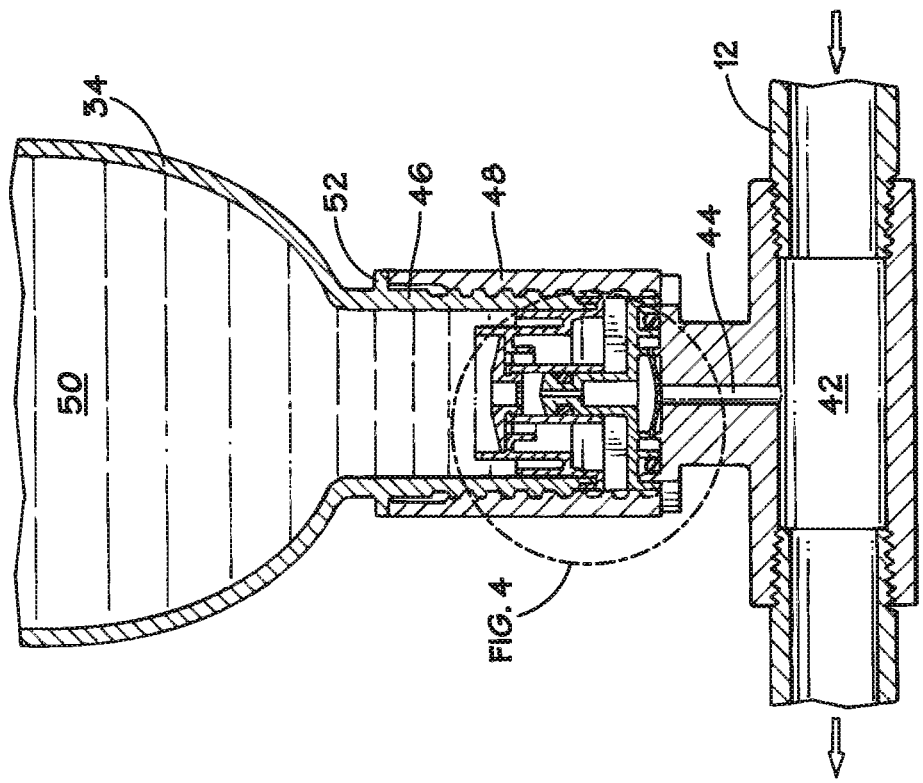
FIG. 3 is a cross-sectional view of a portion of the chemical dispenser and chemical container of the system illustrated in FIG. 1.

FIG. 3 is a cross-sectional view of dispenser 36 according to the embodiment shown in FIG. 1. As shown by the outlined directional arrows in the drawing, irrigation water from supply line 12 flows through main passage 42. Aspirator passage 44 is orthogonal to main passage 12 and of smaller diameter such that water flowing through main passage 42 creates a suction in aspirator line 44.

In the embodiment shown in FIG. 3, chemical container 34 is comprised of a bottle having externally-threaded neck 46. Threaded neck 46 may accommodate a screw-type cap to contain liquid chemical 50 in container 34 when it is not mounted on dispenser 36. Shoulder 52 may be formed on bottle neck 46 to limit the seating depth of neck 46 in internally-threaded connector 48 of dispenser 36.

The body of dispenser 36 may be machined from any suitable material such as a metal or metal alloy or may be molded with a thermoplastic material such as PVC. In FIG. 3, threaded connectors are used to attach dispenser 36 to water supply line 12. Other connection means, including those well-known in the pipe fitting art, may be used. In embodiments wherein the body of dispenser 36 is formed of a synthetic polymer, the connection may be a solvent-welded connection.

It will be appreciated that in order to attach a container of liquid chemical to a dispenser 36 of the type illustrated in FIGS. 1 and 3, it is necessary to invert the container. In order to prevent the chemical from spilling during this operation, it is preferable to equip the container 34 with valve means. One particular preferred embodiment of a valve means is illustrated in FIGS. 3 and 4.

Referring now to FIG. 4, valve insert 56 has U-shaped perimeter section 62 which may connect to rim 54 of neck 46 of container 34 in sealing engagement. Container 34 may be a blow-molded, disposable, plastic bottle.

As may also be seen in FIG. 5, valve insert 56 comprises concentric outer wall 57 (which may be a press fit in bottle neck 46), intermediate wall 58 and inner wall 59. Openings 60 in the section between intermediate wall 58 and inner wall 59 are provided for the passage of air. Central channel 64 of valve insert 56 is sealed at its inner end by valve 66. In the illustrated embodiment, valve 66 is fabricated from an elastomeric polymer material. The perimeter flap 68 of valve 66 seals apertures 60 and the central portion of valve 66 substantially seals central channel 64 of valve insert 56. The center of valve 66 has a generally cylindrical region of reduced thickness which forms septum 67. Slit 69 is provided in septum 67 to permit the flow of liquid chemical 50 from container 34 in response to suction produced by aspirator 44. Preferably, slit 69 is produced by making a cut in septum 67—i.e., slit 69 has no appreciable width and the sides of slit 69 seal against each other and substantially prevent the flow of liquid chemical 50 out of container 34 when it is inverted with normal, ambient pressure present on the open side of valve 66.

Referring now to the exploded view provided in FIG. 6, connector insert 73 includes cylindrical probe 70 having O-ring 75 in a groove on its outer circumference for sealing against the interior wall of central channel 64 of valve insert 56. Probe 70 has a central passage terminating in orifice 71. The feed rate of chemical 50 may be altered by varying the size (diameter) of orifice 71. A pair of transverse slots 72 are provided in the upper surface of the body of connector insert 73. These slots provide a passageway for air to enter container 34 as liquid 50 is withdrawn. The outer, circumferential surface of connector insert 73 has threads 74 for engagement with threaded connector 48 of dispenser 36. Threads 74 have gap(s) 76 substantially aligned with slots 72 to provide a passageway for air. Slots 72 also provide an engagement surface for a tool used to install (or remove) insert 73 in threaded connector 48.

Connector 48 includes circumferential ring or ridge 80. Connector insert 73 includes corresponding ring or ridge 82. O-ring 84 fits between rings 80 and 82 for sealing engagement of connector insert 73 in threaded connector 48. Screen 86 may be provided in the central passageway of dispenser 36 for preventing the entry of undissolved chemicals or foreign matter into the irrigation system to which it is attached.

Figure 7:
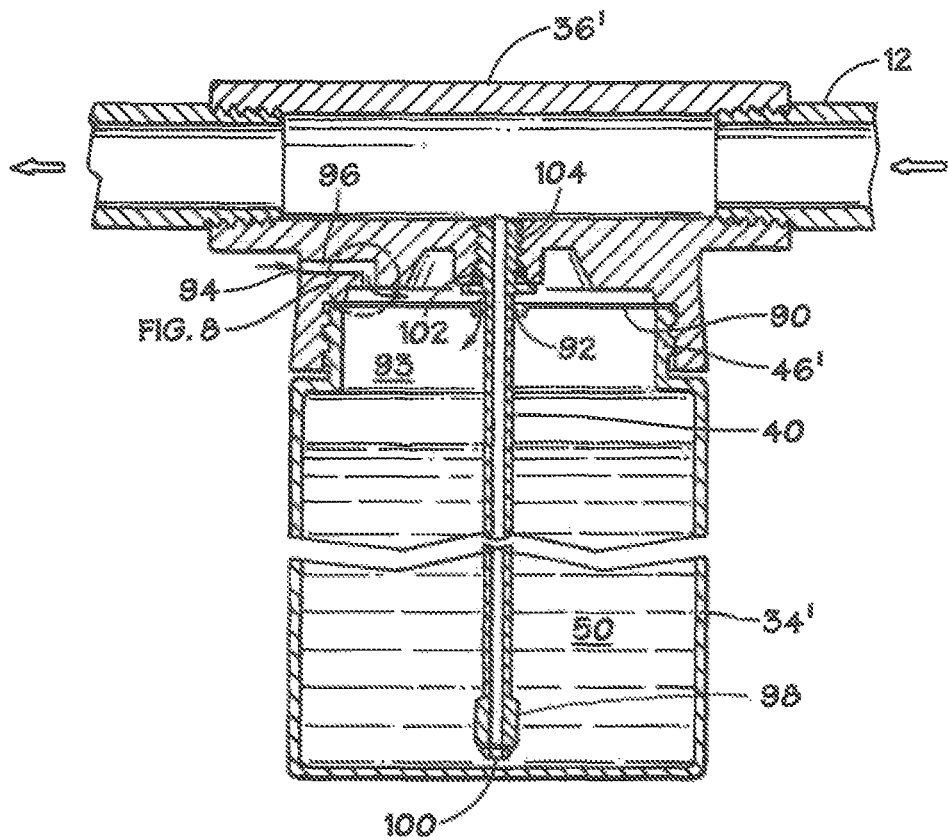
FIG. 7 is a cross sectional view of the chemical dispenser according to the embodiment shown in FIG. 2.

The second illustrated embodiment of the invention is depicted in FIGS. 2 and 7. In this embodiment, container 34' attaches to dispenser 36' on its undersurface—i.e., container 34' need not be inverted in order to attach it to dispenser 36'.

Container 34' may be sealed by a screw-on cap (not shown) and membrane 90. Membrane 90 may be formed of any suitable material as is well known in the art. Examples of sealing membrane materials include plastic polymers, metal foils, treated papers and laminates comprising one or more of these materials. Dip tube 40 is designed to pierce membrane 90. To that end, dip tube 40 may comprise sharpened tip 100. Dip tube 40 may also comprise section 98 of enlarged diameter. Enlarged diameter section 98 is provided near the distal end of tube 40 such that, when tip 100 pierces membrane 90 and section 98 is forced through membrane 90 a larger opening 92 than that merely required to accommodate the smaller diameter section of dip tube 40 is created. An annular opening 92 surrounding tube 40 permits air to enter headspace 93 via vent port 94 and vent passageway 96 as liquid chemical 50 is withdrawn from container 34' thereby relieving the partial vacuum that would otherwise be created and which would substantially stop the aspiration of fluid through tube 40. Dip tube 40 may comprise threaded connector 104 and seal 102 to permit the user to remove and replace dip tube 40. As discussed above, it may be advantageous to remove dip tube 40 in order to permit the installation of cap or plug 38' when container 34' is not in place on dispenser 36'.

Figure 8:
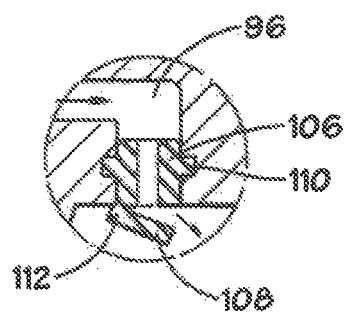
FIG. 8 is an alternative embodiment of the portion shown in the dashed circle in FIG. 7.

FIG. 8 depicts an optional check valve 106 that may be provided in vent passageway 96 for preventing the evaporation of liquid chemical 50 from container 34' and/or preventing the possible discharge of liquid chemical 50 through vent passageway 96 and vent port 94 in the event that the discharge side of dispenser 36' becomes blocked.

Valve 106 may be fabricated from natural rubber or a synthetic elastomeric polymer material. The valve action may be effected by means of flap 108 connected to the body of valve 106 via living hinge 112. Circumferential ridge 110 may be provided to secure valve 106 in a corresponding groove in the wall of passageway 96.

Liquid chemical 50 may be any water-soluble or water-miscible chemical. Examples include fertilizers, pesticides, herbicides, fungicides, growth-enhancing agents, abscission agents, wetting agents, and the like. Oil-based chemicals may also be dispersed as an emulsion in water using the dispenser of the present invention.

The operation of the embodiment of the invention illustrated in FIGS. 1 and 3-6 will now be described with reference to those drawing figures. The user selects a bottle 34 containing the desired treatment chemical(s) and removes the cap from the bottle. If installed, the user also removes plug or cap 38 from dispenser 36. Bottle 34 is inverted and screwed into threaded connector 48 until shoulder 52 is seated on the rim of connector 48 or valve insert 56 contacts the flat, upper surface of connector insert 73. During this installation operation, valve 66 substantially prevents the loss of chemical 50 from bottle neck 46.

Water flowing through main passage 42 produces a suction in aspirator passage 44. This suction is sufficient to draw liquid chemical 50 through slit 69 in septum 67 and into aspirator passage 44. Liquid chemical 50 mixes with water in main passage 42 of dispenser 36 and continues to mix with the water as it flows through the distribution system to the selected zone and out through sprinkler head 28. As liquid is withdrawn from container 34, a partial vacuum is produced. This is relieved by ambient air entering gap 81 in connector 48 and following the path depicted by the arrows in FIG. 4. Flap portion 68 of valve 66 opens in response to the reduced pressure within container 34 and air enters the interior of the container through apertures 60 in valve insert 56. Chemical feed continues until the contents of container 34 are exhausted or the flow of water through main passage 42 ceases. Container 34 may remain in place on dispenser 34 even when empty without adversely affecting the operation of sprinkler system 10. Alternatively, it may be removed and replaced with plug 38.

The operation of the embodiment illustrated in FIGS. 2, 7 and 8 is similar. Cap 38' is removed from dispenser 36' (if installed). A container 34' of liquid chemical 50 is selected and its top (not shown) is removed. If it was previously removed, dip tube 40 is installed by screwing threaded connector 104 into the body of dispenser 36'. Membrane 90 of container 34' is now pressed against tip 100 of tube 40 with sufficient pressure to puncture membrane 90 and force larger diameter section 98 through membrane 90 forming a hole therein that is larger than the smaller diameter section of tube 40. Container 34' is screwed only dispenser 36' and the flow of irrigation water through it is begun. The flow of water across the upper end of dip tube 40 produces a suction in the tube which withdraws liquid chemical 50 from container 34' where it mixes in the main passageway of dispenser 36' and continues downstream and out through sprinkler heads 28 in the selected zone. The partial vacuum produced in headspace 93 by the withdrawal of liquid contents of container 34' is relieved by ambient air entering headspace 93 via vent port 94 and vent passageway 96 as shown by the arrows in FIGS. 7 and 8. Optional check valve 106 prevents supply water from main feed line 12 from passing through tube 40, into the interior of container 34' and out through vent port 94 when all downstream valves are closed. Container 34' also may remain in place on dispenser 34' even when empty without adversely affecting the operation of sprinkler system 10. Alternatively, it may be removed and replaced with plug 38'.

It should be appreciated that container 34 (or 34') may be a disposable container. This feature, together with the action of valve 66 (in the first embodiment) or membrane 90 (in the second illustrated embodiment) provides significant safety benefits to the user. The chances of inadvertent contact with liquid chemical 50 (which may be toxic) are greatly reduced when the user need handle only the exterior of container 34 and disposes of the container following use. Valve 66 (or membrane 90) prevents liquid chemical 50 from splashing or spilling from container 34 (or 34') during handling when its cap or lid is removed.

As shown in FIG. 2, dispenser 36 or 36' may be bypassed in certain embodiments with bypass valve 19 and bypass line 21. In this way, chemical 50 may be applied only to certain selected zones and/or applied only during a portion of the watering cycle. For example, it may be desired to apply a weed-and-feed chemical only to those zones of sprinkler system 10 that apply water to lawn surfaces and not to zones for shrubs or gardens. If bypass valve 19 is electrically actuated, it may be connected to a central control station (not shown) that selects its position in response to the particular zone being watered and/or selects a certain valve position for a certain time interval.

Although the invention has been described in detail with reference to certain preferred embodiments, variations and modifications exist within the scope and spirit of the invention as described and defined in the following claims.

What is claimed is:

1. A liquid chemical dispenser for an irrigation system comprising:
    a body having a passage for the flow of irrigation water;
    a water inlet port on a first side of the body in fluid communication with the water passage, the inlet port having a first diameter;
    a water discharge port on a second side of the body in fluid communication with the water passage, the discharge port having a diameter substantially equal to the first diameter;
    an aspirator passage substantially orthogonal to and in fluid communication with the passage for the flow of water;
    a removable chemical container for containing a liquid chemical for mixing with irrigation water flowing through the body connected to the body and in fluid communication with the aspirator passage, the container having an opening at a first end thereof;
    a membrane which, when intact, seals the opening in the chemical container;
    a dip tube in fluid communication with the aspirator passage for withdrawing liquid chemical from the chemical container, the dip tube consisting of a substantially cylindrical tube having a threaded connector and seal at a first end thereof, a sharpened tip configured for piercing the membrane at an opposing second end thereof, and a section of increased diameter proximate the sharpened tip thereof sized and configured such that when the tip pierces a membrane on the chemical container and the dip tube is inserted in the opening so made, a substantially annular opening in the membrane is produced around the dip tube.

2. A liquid chemical dispenser as recited in claim 1 further comprising a vent port in the body for admitting ambient air in response to reduced pressure within the chemical container, the vent port being in fluid communication with the substantially annular opening in the membrane.

3. A liquid chemical dispenser as recited in claim 2 further comprising a check valve in fluid communication with the vent port configured to prevent the flow of liquid in the container out of the vent port.

4. A liquid chemical dispenser as recited in claim 3 wherein the check valve is a flap valve comprised of an elastomeric polymer.

* * * * *